United States Patent

[11] 3,565,337

[72] Inventor Donald R. Ditto
   2606 Wilton, Dallas County, Tex. 75211
[21] Appl. No. 686,184
[22] Filed Nov. 28, 1967
[45] Patented Feb. 23, 1971

[54] FLAMING FOUNTAIN
   9 Claims, 5 Drawing Figs.
[52] U.S. Cl. .................................................. 239/18
[51] Int. Cl. .................................................. F21p 7/00
[50] Field of Search........................................... 239/16-
   —23; 222/565

[56] References Cited
   UNITED STATES PATENTS
   2,085,824 7/1937 Mullett.......................... 285/133X
   2,775,486 12/1956 King.............................. 222/565X 1,018,431 2/1912 Leichner..... ................ 239/18
   1,083,449 1/1914 Leichner....................... 239/18
   3,104,814 9/1963 Boerder......................... 239/18

Primary Examiner—Samuel F. Coleman
Assistant Examiner—Norman L. Stack, Jr.
Attorney—Howard E. Moore ABSTRACT: A display device and method wherein natural or other combustible gas is mixed with water as water is ejected from a special mixing chamber to cause the gas to be trapped and encapsulated in bubbles suspended in the water stream so that when the mixture of gas and water breaks over by loss of momentum and gravity the bubbles will break, releasing the combustible gas which is ignited and provides a flame at the point where the water breaks over. By varying the pressure of the water ejected from the head, the encapsulated gas may be released at selected heights and is released over a greater area.

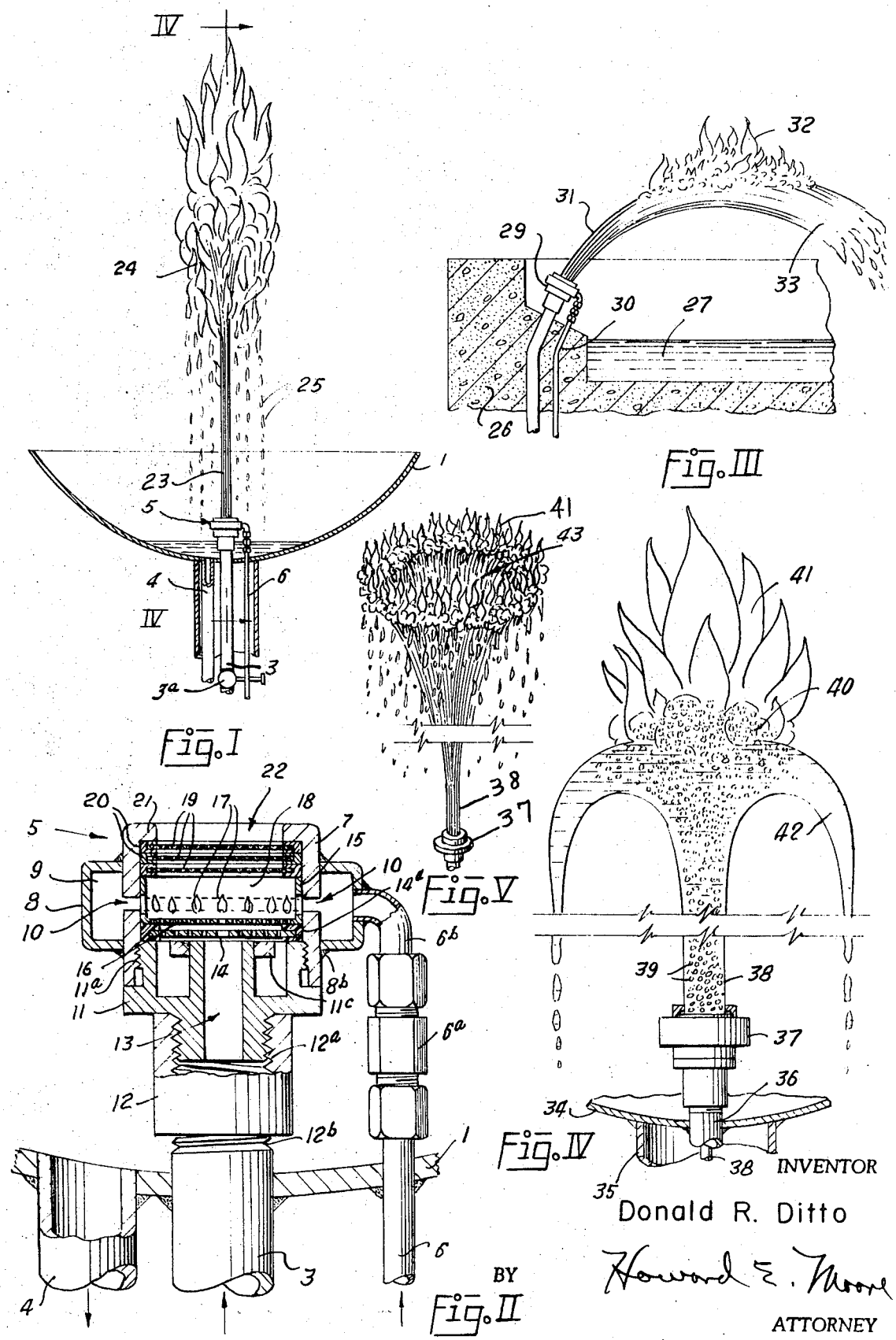

3,565,337

FLAMING FOUNTAIN

BRIEF DESCRIPTION OF THE INVENTION

This invention has particular application for use in water fountains or display devices employed for ornamental purposes or for advertising displays for attracting attention of passers-by. It has heretofore been known in the art to provide flaming fountains wherein the combustible gas is released under surface of water and rises to the surface where it is ignited and to inject a stream of gas into a stream of water as the stream is ejected through a nozzle or opening. However in such previous devices the water was not dispersed and divided before the gas was injected thereinto so that the gas was not thoroughly mixed with the water to provide relatively small bubbles of encapsulated gas throughout the stream so as to provide a uniform flame at a selected point, and it was not possible to distribute the flame in response to adjustment of pressure supplied to the stream of water and gas mixture.

In the present invention the gas is injected into and mixed with the stream of water in a special mixing head where the water is broken down and dispersed as the gas is injected thereinto through spaced orifices so that a thorough mixing of the water and gas is accomplished and uniform mixing has taken place before the mixture is ejected from the head, whereby a stream of mixed gas and water is uniformly permeated with bubbles of encapsulated gas so that when the stream breaks over and separates there is an evenly distributed combustion over a wide area to provide a unique and improved ornamental effect; and by reason of the water being broken down into relatively small particles, the combustion mixture is more evenly distributed throughout the stream.

It is therefore a primary object of the invention to provide a display fountain or the like wherein combustible gas is mixed with a stream of water in such a way as to evenly distribute the gas throughout the stream prior to combustion taking place.

Still another object of the invention is to provide a display device which is versatile in its application in that the mixing head for the gas and water mixture may be placed at selected locations and in differing relationships to provide a desired effect.

Further objects of this invention will become apparent upon reading the detailed specification hereinafter following and by referring to the drawing annexed hereto.

BRIEF DESCRIPTION OF THE DRAWING

A suitable embodiment of the invention is shown in the attached drawing wherein;

FIG. I is an elevational view partially sectionalized of one embodiment of the invention showing the same employed in conjunction with a fountain wherein the flame is concentrated on the upper end of the stream of gas and water mixture;

FIG. II is a cross section elevational view of the mixing head;

FIG. III is a fragmentary partially sectionalized elevational view of another form of the device wherein the flame is concentrated on the upper side and outwardly projected arcuate stream of water and gas mixture;

FIG. IV is a partially sectionalized view of a fountain like that shown in FIG. I illustrating the gas bubbles in the fountain stream and the ignition thereof; and FIG. V is a partially sectionalized elevational view of a fountain like that shown in FIG. I wherein pressure has been reduced to such an extent that the a water breaks over in an annular pattern to provide a circular type of flame.

DESCRIPTION OF THE PREFERRED EMBODIMENTS OF THE INVENTION

Numeral references are employed to indicate the various parts shown in the drawings and like numerals indicate like parts throughout the various FIGS. of the drawings.

The numeral 1 indicates a concave basin or container 1 in which water 2 is deposited after being ejected by the fountain hereinafter described. The water is supplied to the fountain under pressure through supply line 3 and is drained through the base of the container 1 through drainpipe 4. The water may be allowed to drain back to a reservoir (not shown) from which it may be recirculated by a suitable pump (not shown) through the supply pipe 3. Water pressure in supply line 3 may be controlled and varied by manipulating valve 3a disposed therein.

A mixer head 5, hereinafter described, is attached in communication with a supply pipe 3 and with the combustible gas fuel supply pipe 6, in the manner hereinafter described.

The mixer head 5 includes an outer casing 7 which is surrounded by an annular passage 9 provided by the manifold 8. The manifold 8 is secured to the outer surface of the outer casing 7 by suitable welds indicated at 8a and 8b.

A plurality of spaced ports 10 are provided through the wall of the housing 7 and are spaced peripherally thereabout.

An adapter 11 is disengageably attached to the housing 7 by cooperating threads 11a.

The adapter 11 includes an inner tubular portion 11b which provides a central passage 13 thereto. A ring 11c is secured about the upper end of the member 11b which provides a shoulder on which the dispersal thimble 15, hereinafter described, may be positioned.

A coupling 12 attaches the supply pipe 3 to the adapter 11 by means of appropriate threads 12a and 12b respectively.

A perforated plate 14 has a rim 14a thereabout which is positioned on the upper end of the adapter 11.

The water dispersal thimble 15 is a cuplike member which is open at the upper end and has a perforated bottom wall 16 and spaced ports 17 in the sidewall thereof which are in communication with the ports 10 provided through the wall of the housing 7.

A mixing chamber 18 is provided in the thimble 15 and is closed at its upper end by a plurality of circular screen members 19 which have rims 20 thereabout which space the screens apart.

An inwardly turned lip 21 is provided about the opening 22 in the upper end of the housing, and the screens 19 are engaged between the lip 21 and the upper end of the thimble 15 and are held thereagainst by the threaded connection 11a.

The operation and function of the display device hereinbefore described is as follows:

Water is forced under pressure through the supply pipe 3 and passage 13 to the mixer head 15, and fuel gas is supplied through the gas supply pipe 6 which communicates with the annular passage 9 through an appropriate connection 6a and the L connection 6b.

As the water is forced under pressure through the perforated plate 14 and through the perforated lower wall of the thimble 15 it is dispersed and divided so that when it enters the chamber 18 gas fuel is supplied thereto through the ports 10 and 17, and the gas mixes with the dispersed water and the mixture of water and gas is forced through the screens 19 and is emitted outwardly through the passage 22 in the form of a multiplicity of small bubbles which encase combustible gas. Such bubbles are indicated at 39 in FIG. IV. By reason of the pressure applied to the water and gas mixture comprised of encapsulated bubbles it is emitted initially in a stream indicated at 23 in FIG. I and depending upon the pressure applied will rise to a height where gravity overcomes the applied pressure at which height the stream of encapsulated bubbles will begin to fall back. As the mixture of water and gas falls back the bubbles will have a tendency to burst and release the gas. By igniting the fountain at this point a flame will be provided which appears to be floating on the stream of water emitted from the fountain. Such flame is indicated at 24. The water will fall back into the space 1 in the form of droplets as indicated at 25.

By varying the pressure applied to the water as it is emitted from the supply pipe 3, as by manipulating valve 3a, the height of the cascade of water can be varied, thus varying the height at which it will fall back by gravitation and thus the vertical height at which the bubbles will burst and release the gas for ignition. Thus, the length and shape of the flame along the column of water and the position of same therealong can be varied by varying the pressure of the stream of water as gas is ejected from the mixer head 5.

In the modified form of FIG. III, a basin 26 is provided which may be made of suitable material such as cement in which water 27 from the fountain may be deposited and from which same may be circulated to the fountain.

A water supply pipe 28 passes through the wall of the basin 26 and has a mixer head 29 secured to the outer end thereof within the basin. The mixer head 29 is constructed exactly as the mixer head 5 heretofore described.

A gas supply pipe 30 communicates with the mixer head 29 in the same manner as the gas supply 6 communicated with the head 5, as hereinbefore described. A water and gas stream 31 is ejected from the mixer head 29 as hereinbefore described in connection with FIG. I. In this instance the water and gas stream is ejected angularly so as to provide an arcuate stream which falls back by gravity into the basin 27.

As the stream 31 reaches the portion where it begins to fall back by gravity the gas bubbles suspended therein break and may be ignited by a flame 32 on the upper outer surface thereof, which has an unusual ornamental effect as if the water were actually burning. By varying the pressure at which stream of water and gas is ejected, the position and length of the flame along the stream 31 may be varied.

In FIG. IV there is shown a basin 34 which is supported by a support pipe 35.

The water supply pipe 36 extends upwardly through the support pipe 35 and communicates with a mixing head 37 which is the same in construction as the mixing head 5 heretofore described.

A gas and water stream 38 having a multiplicity of encapsulated bubbles of gas 39 suspended therein is ejected through the mixing head 37 after being mixed therein in the manner hereinbefore described.

The bubbles 39 are carried upwardly with the stream 38 and as the stream breaks over by force of gravity, it cascades in an annular fashion and as the column breaks over in such annular fashion the bubbles 39 break as indicated at 40 and are ignited by the flame 41 which extends about the upper edge of the annular portion providing, in effect, a circular flame which may be varied in height and diameter by varying the pressure at which the water is emitted from the head 37. For instance, the flame can be completely brought together as shown in FIG. IV or by decreasing the pressure a hollow center 43 may be provided.

The variation in ejected pressure may be automatically controlled to go through preselected cycles of pressure to thereby vary the flame size, location and design on the ejected stream thereby providing a most unique, attractive and entertaining display.

It will thus be seen that I have provided a flaming fountain display device and method wherein combustible gaseous fuel is mixed with water as it is ejected under pressure so as to suspend encapsulated bubbles in the water which burst and the gas therein ignites when the water falls back by force of gravity to provide a uniform flame superimposed upon a stream or fountain of water and wherein the position, size and shape of the flame on the stream and about same may be varied by varying the pressure at which the water is ejected.

It will be understood that other and further forms of the invention may be devised without departing from the spirit and scope of the appended claims.

I claim:

1. A method of producing a display device comprising the provision of an enclosed mixing chamber having a perforated member across the outlet of the chamber; the simultaneous admission of dispersed water and dispersed combustible gas under pressure into the chamber; the dispersal of said water in said chamber as the gas is mixed therewith to continuously form bubbles of encapsulated gas in the chamber; the ejection of a stream of bubbles from the chamber through the perforated member under pressure; and burning the gas as the bubbles burst in the atmosphere.

2. The method called for in claim 1 wherein the ejection pressure is varied.

3. The method called for in claim 1 wherein the stream is ejected in a vertical column from the chamber.

4. The method called for in claim 1 wherein the stream is ejected laterally and arcuately from the chamber.

5. The method called for in claim 1 wherein the stream breaks over in an annular pattern.

6. In a device of the class described, a water supply conduit, a hollow housing attached to the water supply conduit; a manifold attached about the housing providing an annular passage thereabout; spaced ports through the wall of the housing communicating between the interior of the housing and the annular passage; a combustible gas supply line communicating with the annular passage; perforated water dispersal means between the water supply conduit and the interior of the housing; a restricted outlet passage from the housing and perforated means across the restricted outlet passage from the housing.

7. The combination called for in claim 6 wherein the dispersal means comprises a perforated plate across the conduit passage entrance into the housing; and a thimble above the plate having a perforated bottom wall and passages through the sidewall communicating with the ports through the wall of the housing.

8. The combination called for in claim 7 wherein the perforated means comprises a plurality of screens above the thimble, across the outlet passage.

9. A method of producing a display device comprising, providing a mixing chamber having a water inlet passage and a water outlet passage; admitting water through substantially vertically disposed perforations into the mixing chamber through the water inlet passage to form dispersed streams of water; admitting combustible gas through substantially horizontally disposed perforations in the sidewall of the mixing chamber to form dispersed streams of combustible gas impinging with the dispersed streams of water to continuously form bubbles of encapsulated gas in the mixing chamber; ejecting the bubbles of encapsulated gas through the water outlet passage of the mixing chamber into the atmosphere, forming a stream of bubbles; and burning the gas as the bubbles burst in the atmosphere.